US012592605B2

(12) United States Patent (10) Patent No.: US 12,592,605 B2
Torii et al. (45) Date of Patent: Mar. 31, 2026

(54) COOLING SYSTEM FOR DRIVE DEVICE

(71) Applicant: AISIN CORPORATION, Kariya (JP)

(72) Inventors: Takeshi Torii, Kariya (JP); Shoichi Yamasaki, Kariya (JP)

(73) Assignee: AISIN CORPORATION, Kariya (JP)

( * ) Notice: Subject to any disclaimer, the term of this patent is extended or adjusted under 35 U.S.C. 154(b) by 204 days.

(21) Appl. No.: 18/562,595

(22) PCT Filed: Jul. 13, 2022

(86) PCT No.: PCT/JP2022/027536
§ 371 (c)(1),
(2) Date: Nov. 20, 2023

(87) PCT Pub. No.: WO2023/008197
PCT Pub. Date: Feb. 2, 2023

(65) Prior Publication Data
US 2024/0235316 A1 Jul. 11, 2024

(30) Foreign Application Priority Data

Jul. 26, 2021 (JP) ................................. 2021-121586

(51) Int. Cl.
*H02K 5/20* (2006.01)
*H02K 9/19* (2006.01)
(52) U.S. Cl.
CPC ................. *H02K 5/20* (2013.01); *H02K 9/19* (2013.01)
(58) Field of Classification Search
CPC .......... B60K 11/02; B60K 11/04; B60K 1/00; B60K 2001/001; B60K 2001/003;
(Continued)

(56) References Cited

U.S. PATENT DOCUMENTS

2003/0173839 A1* 9/2003 Torii ...................... H02K 11/33
310/52
2006/0174643 A1* 8/2006 Ostrom .................... H02K 9/19
62/119
(Continued)

FOREIGN PATENT DOCUMENTS

JP 2019-129608 A 8/2019
JP 2019216515 A * 12/2019
WO 2015/093138 A1 6/2015

OTHER PUBLICATIONS

JP-2019216515-A translation (Year: 2019).*
International Search Report for PCT/2022/027536 dated Oct. 4, 2022.

*Primary Examiner* — Oluseye Iwarere
*Assistant Examiner* — Nicholas Lee Setzer
(74) *Attorney, Agent, or Firm* — Sughrue Mion, PLLC

(57) ABSTRACT

A case (1) that houses a rotary electric machine (2) and an inverter device (INV) has an inlet (11) through which coolant flows, and a channel (4) along which the coolant flows. The channel (4) includes a first heat exchange portion (41) where heat is exchanged between the inverter device (INV) and the coolant, and a turbine disposition portion (43) where a turbine (7) is disposed. The turbine (7) is rotated by a flow of the coolant passing through the turbine disposition portion (43), and a pump rotor (88) of an oil pump (8) that discharges oil to be supplied to the rotary electric machine (2) is drivingly connected to the turbine (7).

4 Claims, 4 Drawing Sheets

(58) Field of Classification Search
CPC .... B60K 2001/006; H02K 5/20; H02K 5/203;
H02K 9/19; H02K 9/193; H02K 9/197;
H02K 9/20
See application file for complete search history.

(56) References Cited

U.S. PATENT DOCUMENTS

| | | | |
|---|---|---|---|
| 2016/0276895 A1* | 9/2016 | Aizawa | H02K 3/46 |
| 2017/0047822 A1* | 2/2017 | Horii | H02K 5/203 |
| 2019/0229582 A1* | 7/2019 | Ito | B60K 1/00 |
| 2020/0180393 A1* | 6/2020 | Jeong | H01M 10/613 |
| 2021/0091629 A1* | 3/2021 | Iwase | B60K 1/00 |
| 2022/0316582 A1* | 10/2022 | Inoue | F16H 57/0483 |

* cited by examiner

COOLING SYSTEM FOR DRIVE DEVICE

CROSS REFERENCE TO RELATED APPLICATION

This application is a National Stage of International Application No. PCT/JP2022/027536 filed Jul. 13, 2022, claiming priority based on Japanese Patent Application No. 2021-121586 filed Jul. 26, 2021, the entire contents of which are incorporated in their entirety.

TECHNICAL FIELD

The present disclosure relates to a drive device including a rotary electric machine, an inverter, a case, and an oil pump.

BACKGROUND ART

Japanese Unexamined Patent Application Publication No. 2019-129608 (JP 2019-129608 A) discloses a vehicle drive device (14) in which an electric oil pump (44) is installed in addition to a mechanical oil pump (40) inside a case (18) that houses a rotary electric machine (12) to supply cooling oil to coil ends (12e) of the rotary electric machine (12) (reference numerals in parentheses in the background art are those in the reference document). In this drive device (14), the electric oil pump (44) is driven depending on the temperature of the rotary electric machine (12). Therefore, when the rotary electric machine (12) including the coil ends (12e) needs to be cooled, the cooling oil can appropriately be supplied regardless of the rotation states of rotary members in the drive device (14) serving as a drive source for the mechanical oil pump (14).

RELATED ART DOCUMENTS

Patent Documents

Patent Document 1: Japanese Unexamined Patent Application Publication No. 2019-129608 (JP 2019-129608 A)

SUMMARY OF THE DISCLOSURE

Problem to be Solved by Various Aspects of the Disclosure

When the electric oil pump is separately provided for cooling as described above, the cost and dimensions of the drive device increase.

Therefore, there is a demand to supply oil to the rotary electric machine at an appropriate timing while suppressing the increase in the cost and dimensions of the drive device.

Means for Solving the Problem

In view of the above problem, a drive device includes a rotary electric machine, an inverter configured to drive the rotary electric machine, a case that houses the rotary electric machine and the inverter, and an oil pump configured to discharge oil to be supplied to the rotary electric machine, in which the case has a channel along which coolant flows, the channel includes a first heat exchange portion where heat is exchanged between the inverter and the coolant, and a turbine disposition portion where a turbine is disposed, and the turbine is configured to rotate by a flow of the coolant passing through the turbine disposition portion, and a pump rotor of the oil pump is drivingly connected to the turbine.

According to this configuration, the turbine can be rotated by the flow of the coolant, and the pump rotor can be driven by the rotation of the turbine. Therefore, the configuration of the oil pump can be simplified compared to a configuration in which a drive source for the oil pump is provided separately as in the case of, for example, an electric oil pump. Compared to a configuration in which the oil pump is driven by using the driving force of the rotary electric machine, a power transmission mechanism between the rotary electric machine and the oil pump is unnecessary, and the loss of the driving force of the rotary electric machine due to the drive of the oil pump can be avoided. The inverter is likely to generate heat in a situation where electric power is being supplied to the rotary electric machine. Therefore, it is often necessary to cool the rotary electric machine as well in a situation where the inverter needs to be cooled. According to this configuration, in a situation where the inverter is being cooled by the coolant, the rotary electric machine can also be cooled by supplying the oil to the rotary electric machine through the drive of the oil pump using the coolant. Thus, both the inverter and the rotary electric machine can appropriately be cooled at an appropriate timing. As described above, according to this configuration, the oil can be supplied to the rotary electric machine at an appropriate timing while suppressing the increase in the cost and dimensions of the drive device.

Further features and advantages of the drive device will become apparent from the following description of an exemplary and non-limiting embodiment that will be given with reference to the drawings.

MODES FOR CARRYING OUT THE EMBODIMENTS

Hereinafter, an embodiment of a drive device will be described with reference to the drawings taking an exemplary vehicle drive device that is mounted on a vehicle and drives wheels. The direction of each member in the following description represents a direction in a state in which a drive device 100 is mounted on a vehicle (vehicle-mounted state). Terms related to the dimension, the disposition direction, the disposition position, and the like of each member represent concepts that include a state in which there is a difference due to a variation (variation to an extent permissible in manufacturing). In the vehicle-mounted state, a direction along rotation axes of the drive device 100 (in the present embodiment, a first axis A1, a second axis A2, and a third axis A3 that are different axes parallel to each other; details will be described later) will be referred to as "axial direction L". One side in the axial direction L will be referred to as "first axial side L1" and the other side in the axial direction L will be referred to as "second axial side L2". A direction orthogonal to each of the first axis A1, the second axis A2, and the third axis A3 will be referred to as "radial direction" with respect to each axis. A direction along the vertical direction when the drive device 100 is attached to the vehicle will be referred to as "up-down direction V". When indicating upper and lower directions, they will be referred to as "upper side V1" and "lower side V2". When the drive device 100 is attached to the vehicle with the axial direction L parallel to a horizontal plane, one direction of the radial direction agrees with the up-down direction V.

Figure 1:
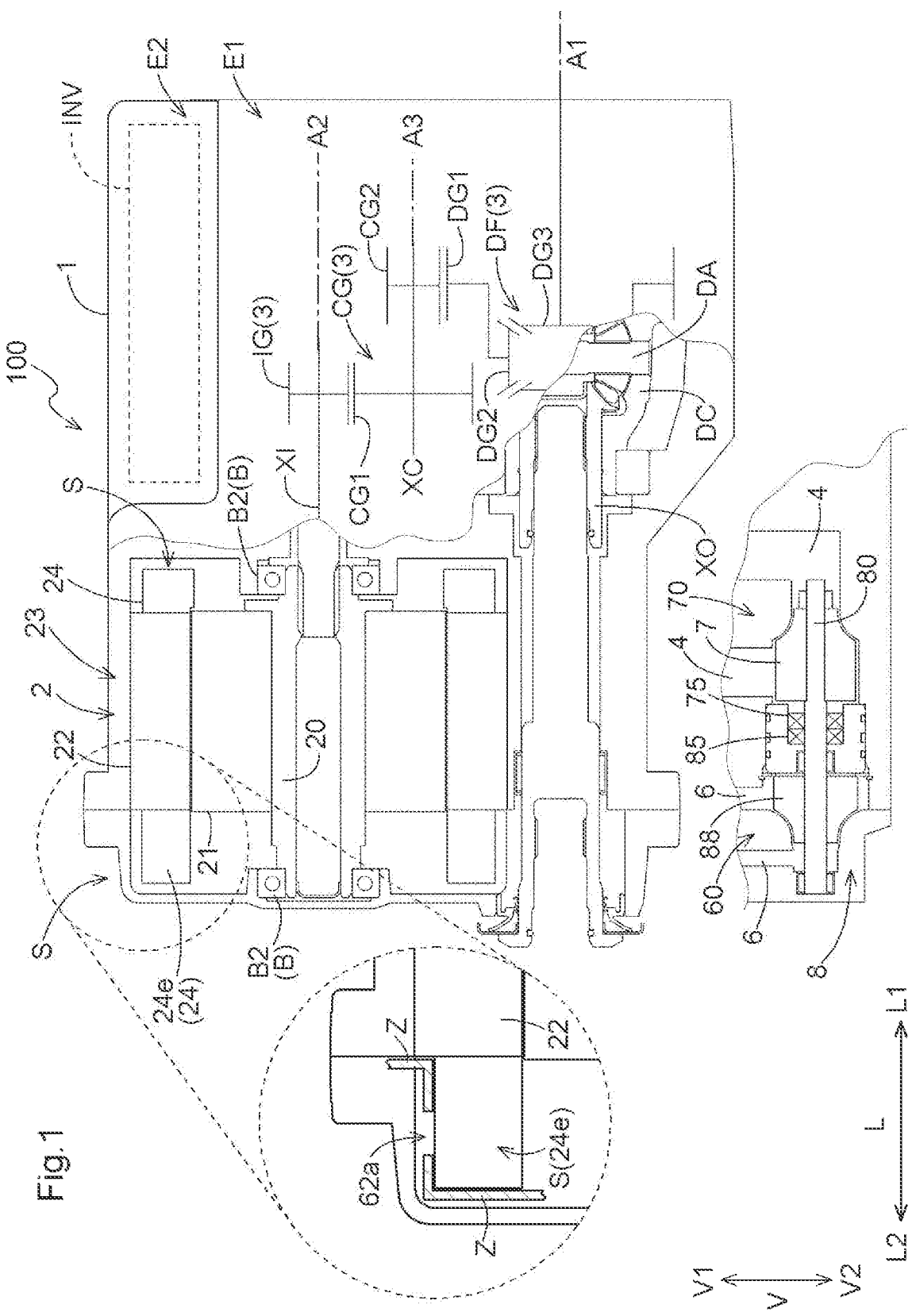
FIG. 1 is a schematic sectional view showing an example of a drive device.
Figure 2:
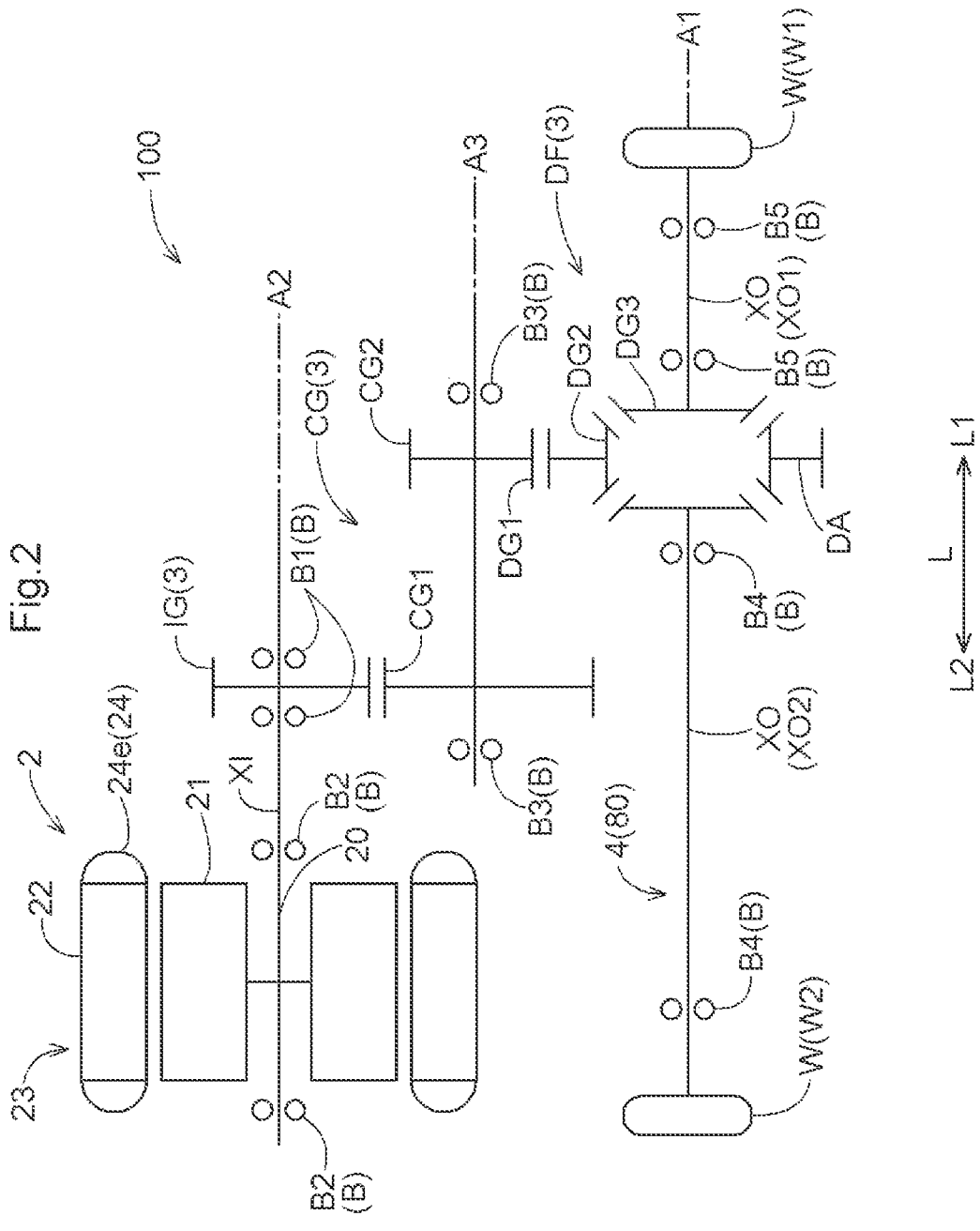
FIG. 2 is a skeleton diagram showing an example of the drive device.

As shown in FIGS. 1 and 2, the drive device 100 includes a rotary electric machine 2, a transmission mechanism 3 that transmits power between the rotary electric machine 2 and wheels W, and a case 1 that houses the rotary electric machine 2 and the transmission mechanism 3. In the present embodiment, the rotary electric machine 2 is a drive source that drives the wheels W. In the present embodiment, the transmission mechanism 3 includes a differential gear mechanism DF drivingly connected to the wheels W, a counter gear mechanism CG drivingly connecting the rotary electric machine 2 and the differential gear mechanism DF, and an input gear IG drivingly connecting the rotary electric machine 2 and the counter gear mechanism CG. The differential gear mechanism DF is disposed on the first axis A1 together with the wheels W as will be described later. The rotary electric machine 2 together with the input gear IG is disposed on the second axis A2 different from and parallel to the first axis A1. The counter gear mechanism CG is disposed on the third axis A3 parallel to the first axis A1 and the second axis A2.

The rotary electric machine 2 is, for example, a rotary electric machine (motor generator) that operates by multiphase alternating current (e.g., three-phase alternating current), and can function as both an electric motor and a generator. The rotary electric machine 2 is supplied with electric power from a direct current power supply (not shown) to perform power running, or supplies (regenerates) electric power generated by the inertial force of the vehicle to the direct current power supply. The drive of the rotary electric machine 2 is controlled by an inverter device INV (inverter). In the present embodiment, as shown in FIG. 1, the inverter device INV is also housed in the case 1. The inverter device INV includes an inverter circuit (not shown) that converts electric power between direct current power and multi-phase alternating current power. The inverter circuit is connected to the alternating-current rotary electric machine 2 and the direct current power supply, and converts electric power between direct current and multi-phase (e.g., three-phase) alternating current. The direct current power supply is a secondary battery (battery) such as a nickel-metal hydride battery or a lithium-ion battery, or an electric double layer capacitor. When the rotary electric machine 2 is the drive source for the vehicle, the rated power supply voltage of the direct current power supply is, for example, 200 to 400 [V].

The inverter circuit includes a plurality of switching elements. It is preferable that a power semiconductor element configured to operate at a high frequency, such as an insulated gate bipolar transistor (IGBT), a power metal oxide semiconductor field effect transistor (MOSFET), a silicon carbide-metal oxide semiconductor FET (SiC-MOSFET), a SiC-static induction transistor (SiC-SIT), and a gallium nitride-MOSFET (GaN-MOSFET) be applied to the switching elements. For example, the inverter circuit is structured by being integrated into one power module, including freewheeling diodes as well. The inverter circuit includes, on its direct current side, a direct-current link capacitor (smoothing capacitor) for smoothing a voltage between positive and negative terminals (direct-current link voltage).

The inverter circuit is controlled by an inverter control device (not shown). The inverter control device is built by using a logic circuit such as a microcomputer as a core component, and controls the drive of the rotary electric machine 2 via the inverter circuit by, for example, current feedback control. The microcomputer or the like constituting the inverter control device operates by being supplied with electric power from a low-voltage direct current power supply with a lower voltage (e.g., 12 to 24 [V]) than the direct current power supply connected to the inverter circuit. Therefore, the inverter control device includes a drive circuit that increases the driving capacity (e.g., capacity to operate a subsequent circuit, such as a voltage amplitude and an output current) of a switching control signal for each switching element (gate drive signal in the case of an IGBT) and relays the switching control signal. The inverter control device is structured by mounting the above microcomputer, its peripheral circuits, and circuit components of the drive circuit on one or more substrates.

The inverter device INV includes at least the inverter circuit (power module). In the present embodiment, the inverter device INV is structured as a unit including the inverter control device, the direct-current link capacitor, and the inverter circuit (power module) described above. As described later, the inverter device INV is disposed in a second housing portion E2 inside the case 1 and fixed to the case 1 with fastening members such as bolts.

The rotary electric machine 2 includes a stator 23 fixed to the case 1 or the like, and a rotor 21 rotatably supported on a radially inner side of the stator 23. In the present embodiment, the stator 23 includes a stator core 22 and stator coils 24 wound around the stator core 22, and the rotor 21 includes a rotor core and permanent magnets disposed in the rotor core. The rotor 21 of the rotary electric machine 2 is connected to a rotor shaft 20 that rotates integrally with the rotor 21. An input shaft XI is connected to the rotor shaft 20 so as to rotate integrally with the rotor shaft 20. The rotor shaft 20 is rotatably supported by the case 1 via rotor bearings B2, and the input shaft XI is rotatably supported by the case 1 via input bearings B1. The input gear IG is provided on the input shaft XI so as to rotate integrally with the input shaft XI. The input gear IG meshes with a first counter gear CG1 of the counter gear mechanism CG as will be described later. That is, the input gear IG functions as a part of the transmission mechanism to rotate integrally with the rotor 21 and transmit a driving force of the rotary electric machine 2 to the counter gear mechanism CG.

The differential gear mechanism DF is disposed on the first axis A1 and distributes the driving force transmitted from the rotary electric machine 2 side to the pair of wheels W. The differential gear mechanism DF includes a plurality of bevel gears that meshes with each other and a differential case DC that houses the plurality of bevel gears. The differential gear mechanism DF distributes and transmits the rotation and torque input to a differential input gear DG1 from the rotary electric machine 2 side to a pair of output shafts XO via a pair of side gears DG3 that meshes with pinion gears DC2 rotatably supported by a pinion shaft DA that is disposed along the radial direction and rotates integrally with the differential input gear DG1. In the present embodiment, a first wheel W1 is connected to a first output shaft XO1 on the first axial side L1 of the differential gear mechanism DF, and a second wheel W2 is connected to a second output shaft XO2 on the second axial side L2 of the differential gear mechanism DF. The first output shaft XO1 is rotatably supported by the case 1 via first output bearings B5, and the second output shaft XO2 is rotatably supported by the case 1 via second output bearings B4 (see FIG. 2).

The counter gear mechanism CG is disposed on the third axis A3, and drivingly connects the rotary electric machine 2 and the differential gear mechanism DF via the input gear IG. In the present embodiment, the counter gear mechanism CG includes the first counter gear CG1 and a second counter gear CG2 connected by a counter shaft XC. That is, the counter gear mechanism CG includes the first counter gear CG1 that is disposed on the third axis A3 and meshes with the input gear IG, and the second counter gear CG2 that rotates integrally with the first counter gear CG1 and meshes with the differential input gear DG1. The counter shaft XC is rotatably supported by the case 1 via counter bearings B3.

As described above, in the present embodiment, the input gear IG, the counter gear mechanism CG, and the differential gear mechanism DF are provided as the transmission mechanism 3 in this order from the rotary electric machine 2 side in a power transmission path connecting the rotary electric machine 2 and the wheels W.

In the present embodiment, the case 1 includes a first housing portion E1 that houses the rotary electric machine 2, and the second housing portion E2 that houses the inverter device INV as shown in FIG. 1. In the present embodiment, the first housing portion E1 and the second housing portion E2 are formed integrally. That is, the case 1 includes an integrally formed body part including the first housing portion E1 that houses the rotary electric machine 2 (including the transmission mechanism 3), and the second housing portion E2 that houses the inverter device INV. The term "integrally formed" refers to, for example, a unitary member made of a common material as a single die casting.

In the rotary electric machine 2 serving as the drive source for the wheels W, a current flowing through the stator coils 24 is large and a large amount of heat is likely to be generated due to the electrical resistance of the stator coils 24. As described above, the stator coils 24 are wound around the stator core 22, and coil end portions 24e are formed at the ends of the stator 23 in the axial direction L such that bent portions of the wound stator coils 24 protrude in the axial direction L from the stator core 22. The stator coils 24 are often cooled by applying a refrigerant to the coil end portions 24e. As a matter of course, the stator coils 24 are conductors and a non-conductive fluid such as oil is used as the refrigerant.

Figure 3:
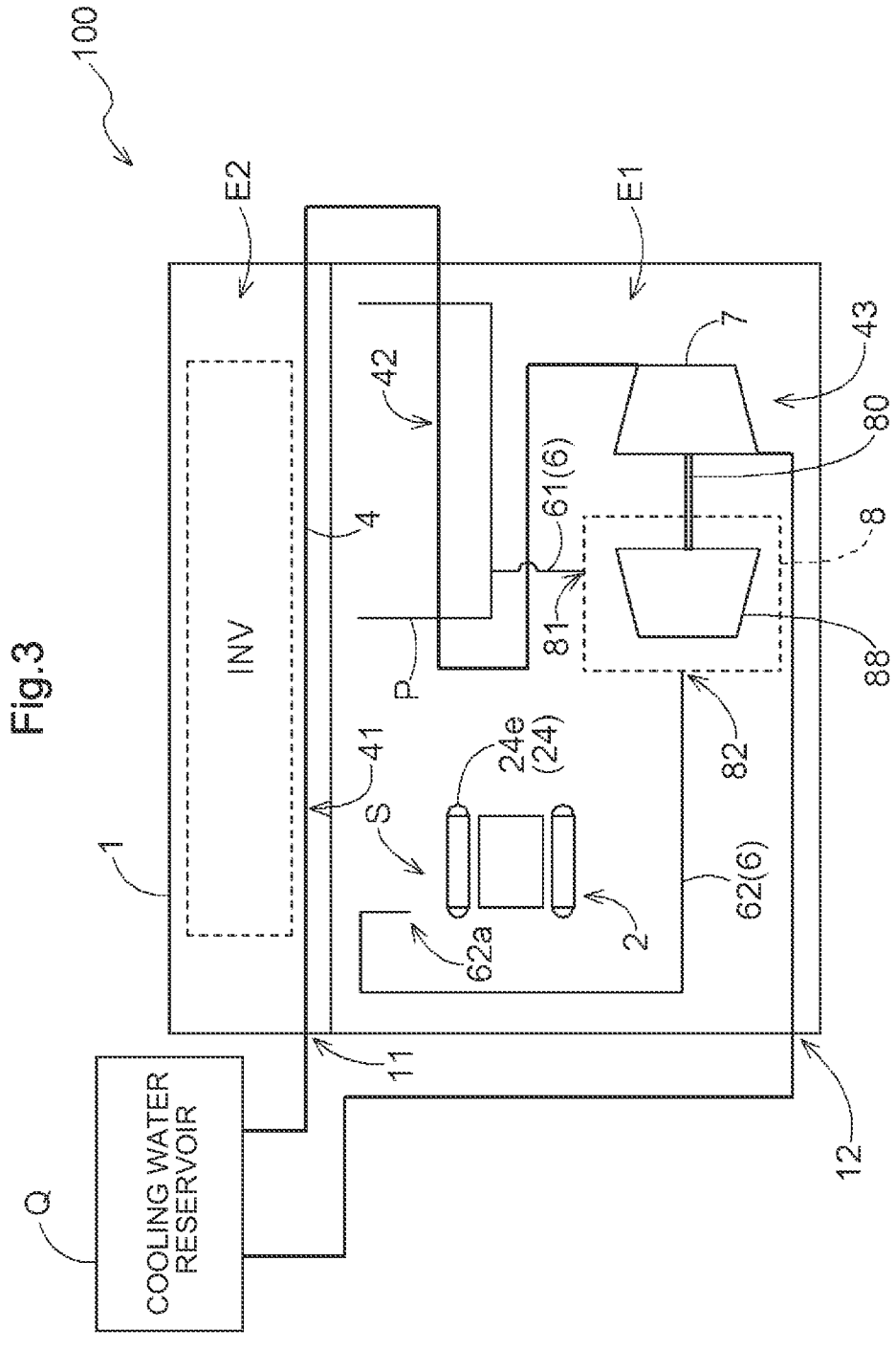
FIG. 3 is a diagram showing an example of the configuration of an oil pump and an example of distribution paths of oil and coolant.

In order to supply the oil to the stator coils 24 (coil end portions 24e) inside the case 1, it is conceivable to, for example, install an oil pump inside the case 1. For example, when a mechanical oil pump such as a trochoid pump to be driven by a rotary member inside the drive device 100 is disposed as such an oil pump, the oil supply is affected by the rotation state of the rotary member. Therefore, there is a possibility that the oil cannot appropriately be supplied when cooling is needed. For example, when an electric oil pump is separately installed for cooling, the cost and dimensions of the drive device 100 increase. The drive device 100 of the present embodiment has a feature in that the drive device 100 includes an oil pump 8 that can supply the oil to the rotary electric machine 2 at an appropriate timing while suppressing the increase in the cost and dimensions of the drive device 100. The following description will be given also with reference to FIG. 3 showing an example of the configuration of the oil pump 8 and an example of distribution paths of oil and coolant.

As shown in FIG. 1, the drive device 100 of the present embodiment includes the rotary electric machine 2, the inverter device INV that drives the rotary electric machine 2, the case 1 that houses the rotary electric machine 2 and the inverter device INV, and the oil pump 8 that discharges oil to be supplied to the rotary electric machine 2. As shown in FIG. 3, the case 1 has an inlet 11 through which the coolant flows in, an outlet 12 through which the coolant flows out, and a channel 4 along which the coolant flows. Although the channel 4 along which the coolant flows between the inlet 11 and the outlet 12 is exemplified, the entire channel 4 need not be disposed inside the case 1. For example, a part of the channel 4 may be disposed outside the case 1. The channel 4 includes a first heat exchange portion 41 where heat is exchanged between the inverter device INV and the coolant, and a turbine disposition portion 43 where a turbine 7 is disposed. The turbine 7 is rotated by a flow of the coolant passing through the turbine disposition portion 43. A pump rotor 88 of the oil pump 8 is drivingly connected to the turbine 7. The pump rotor 88 is driven by the rotation of the turbine 7. Although FIG. 3 exemplifies the form in which the turbine 7 is disposed inside the case 1, the turbine 7 may be disposed outside the case 1 when a part of the channel 4 is disposed outside the case 1.

In the present embodiment, the pump rotor 88 is driven by the turbine 7 that is rotated by the flow of the coolant. Therefore, the configuration of the oil pump 8 can be simplified compared to a configuration in which a drive source for the pump is provided separately as in the case of, for example, an electric oil pump. Compared to, for example, a configuration in which the pump is driven by using the driving force of the rotary electric machine 2, a power transmission mechanism between the rotary electric machine 2 and the oil pump 8 is unnecessary, and the loss of the driving force of the rotary electric machine 2 due to the drive of the oil pump 8 can be avoided. The inverter device INV is likely to generate heat in a situation where electric power is being supplied to the rotary electric machine 2. Therefore, it is often necessary to cool the rotary electric machine 2 as well in a situation where the inverter device INV needs to be cooled. In the present embodiment, both the inverter device INV and the rotary electric machine 2 can appropriately be cooled at an appropriate timing. That is, in the present embodiment, in a situation where the inverter device INV is being cooled by the coolant, the rotary electric machine 2 can also be cooled by supplying oil to the rotary electric machine 2 through the drive of the oil pump 8 using the flow of the coolant.

As shown in FIG. 1, the turbine 7 and the pump rotor 88 are connected via a pump shaft 80. The pump shaft 80 is rotatably supported by the case 1, and the turbine 7 and the pump rotor 88 are connected to the pump shaft 80 so as to rotate integrally with the pump shaft 80. When the turbine 7 is rotated by the cooling water, the pump rotor 88 is also rotated together with the pump shaft 80. A turbine chamber 70 in which the turbine 7 is disposed and a pump chamber 60 in which the pump rotor 88 is disposed are kept liquid-tight by sealing members so that the coolant and the oil are not mixed with each other. In this example, a turbine-side sealing member 75 is disposed on the turbine chamber 70 side, and a pump-side sealing member 85 is disposed on the pump chamber 60 side.

As shown in FIG. 3, the oil pump 8 is connected to an oil reservoir P via a first oil passage 61, and is connected to a target space S that is a space where a supply target to which oil is supplied via a second oil passage 62 is disposed. In other words, the first oil passage 61 is an oil passage 6 that communicates a suction port 81 of the oil pump 8 and the oil reservoir P, and the second oil passage 62 is an oil passage 6 that communicates a discharge port 82 of the oil pump 8 and the target space S.

The oil reservoir P is an oil pan (oil sump) formed at the bottom of the case 1 or a catch tank disposed on the upper side V1 of the oil pan in the case 1. The oil pan stores oil that has descended by gravity at the bottom of the case 1. The oil accumulated in the oil pan is stirred up by any rotary member constituting the transmission mechanism 3, and lubricates bearings B such as the input bearings B1, the counter bearings B3, the first output bearings B5, and the second output bearings B4. The catch tank catches the stirred up oil and temporarily stores it before it falls into the oil pan. In FIG. 3, the catch tank is exemplified as the oil reservoir P, but the oil reservoir P may be the oil pan as a matter of course.

In the present embodiment, the oil supply target includes the coil end portions 24e of the stator coils 24. In this case, the target space S corresponds to the space where the coil end portions 24e are disposed. As shown in FIG. 1, the rotor bearings B2 are disposed at positions where they overlap the coil end portions 24e when viewed in the up-down direction, and can be lubricated by the fall of oil that has cooled the coil end portions 24e. Therefore, the rotor bearings B2 can also be the oil supply target, and the space where the rotor bearings B2 are disposed can also be the target space S. As a matter of course, the other bearings B, intermeshing gears, or the like can also be the supply target, and the space where they are disposed can be the target space S.

It is sufficient that the oil pressure of the oil discharged by the oil pump 8 whose driving force source is the turbine 7 rotated by the coolant be a pressure that can guide the oil into the target space S through the second oil passage 62. For example, it is sufficient that the oil pressure be an oil pressure lower than an oil pressure for driving a friction engagement device or the like. With such a simple configuration, the oil pump 8 can be structured on a small scale.

As shown in FIG. 1, an oil supply port 62a for supplying the oil to the target space S (coil end portion 24e) is provided inside the case 1. The discharge port 82 of the oil pump 8 communicates with the oil supply port 62a via the second oil passage 62. The oil supply port 62a is located in association with the coil end portion 24e of the stator coil 24, and is made of a non-conductive member Z.

As described above, a high voltage is applied to the stator coil 24. Since the oil supply port 62a is made of the non-conductive member Z, the oil supply port 62a can be located close to the stator coil 24 while reducing the possibility of the occurrence of a short circuit. Therefore, the stator coil 24 can effectively be cooled by the oil. Since the heat generation in the inverter device INV and the heat generation in the stator coil 24 often occur simultaneously, the cooling with the oil can efficiently be performed by using the flow of the cooling water.

The cooling effect increases as the flow rate of the cooling water increases. The channel 4 acts as a resistance to the cooling water. Therefore, it is preferable that the channel 4 be disposed as short as possible. In the drive device 100 of the present embodiment, the channel 4 is structured so as to be short as described below.

In the present embodiment, both the oil pump 8 and the turbine 7 are disposed inside the case 1 as shown in FIGS. 1 and 3. Although illustration is omitted, it is preferable that at least one of the oil pump 8 and the turbine 7 be disposed inside the case 1. When the oil pump 8 is disposed inside the case 1, the oil passage 6 from the oil pump 8 to the rotary electric machine 2 can easily be shortened compared to a configuration in which the oil pump 8 is disposed outside the case 1. When the turbine 7 is disposed inside the case 1, the channel can easily be shortened compared to a configuration in which the turbine 7 is disposed outside the case 1.

As described above, the case 1 includes the first housing portion E1 that houses the rotary electric machine 2, and the second housing portion E2 that houses the inverter device INV. The first housing portion E1 and the second housing portion E2 are formed integrally. Therefore, the channel 4 can easily be shortened compared to a configuration in which the first housing portion E1 and the second housing portion E2 are separated.

As shown in FIG. 3, in the present embodiment, the drive device 100 includes a second heat exchange portion 42 where heat is exchanged between the oil stored in the oil reservoir P provided inside the case 1 and the coolant. The channel 4 of the coolant is formed such that the coolant flows from a cooling water reservoir Q to the first heat exchange portion 41, the second heat exchange portion 42, and the turbine disposition portion 43 in the stated order via the inlet 11 and returns to the cooling water reservoir Q via the outlet 12. In other words, the first heat exchange portion 41, the second heat exchange portion 42, and the turbine disposition portion 43 are disposed in this order along the channel 4 from the inlet 11 to the outlet 12, that is, from an upstream side to a downstream side.

As described above, the first heat exchange portion 41 cools the inverter device INV by exchanging heat with the inverter device INV. By providing the second heat exchange portion 42, the oil stored in the oil reservoir P can be cooled by exchanging heat with the oil. That is, both the oil and the inverter device INV inside the case 1 can be cooled by the coolant. As described above, the oil stored in the oil reservoir P is supplied to the coil end portion 24e of the rotary electric machine 2 by the oil pump 8. By supplying the oil cooled by the coolant to the rotary electric machine 2, the rotary electric machine 2 can also be cooled effectively.

When the coolant rotates the turbine 7, the flow rate of the coolant decreases. Heat exchange is performed more effectively when the flow rate of the coolant is higher. The first heat exchange portion 41 and the second heat exchange portion 42 are disposed upstream of the turbine disposition portion 43 in the channel 4. Therefore, cooling can efficiently be performed in the first heat exchange portion 41 and the second heat exchange portion 42 before the flow rate decreases due to the rotation of the turbine 7. Since the coolant passes through the first heat exchange portion 41 before passing through the second heat exchange portion 42, the inverter device INV can appropriately be cooled by the coolant before the temperature rises by absorbing heat from the hot oil. That is, the inverter device INV can be cooled by the coolant having a higher cooling capacity. In many cases, the cooling water reservoir Q has a function of radiating heat from cooling water. Therefore, the coolant is cooled by the cooling water and then supplied to the drive device 100 to effectively cool the inverter, cool the oil, and drive the turbine 7.

As described above, according to the present embodiment, the oil can be supplied to the rotary electric machine at an appropriate timing while suppressing the increase in the cost and dimensions of the drive device.

[Other Embodiments]

Hereinafter, other embodiments will be described. The configuration of each embodiment described below is not limited to being applied alone, and can be applied in combination with the configurations of other embodiments as long as there is no contradiction.

(1) The above description exemplifies the form in which the first housing portion E1 that houses the rotary electric machine 2 and the second housing portion E2 that houses the inverter device INV are formed integrally. However, this does not preclude a form in which these are formed as separate members and integrated by being fastened, for example, with a fastening member.

(2) The above description exemplifies the form in which the turbine 7 and the pump rotor 88 are connected via the pump shaft 80 so as to rotate integrally. However, the turbine 7 and the pump rotor 88 only need to be connected so as to rotate in conjunction with each other, and may be drivingly connected, for example, via a gear mechanism, a chain, or a belt. The turbine 7 and the pump rotor 88 may be connected by non-contact connection means such as magnetic coupling.

(3) The above description exemplifies the form in which at least one of the oil pump 8 and the turbine 7 is disposed inside the case 1. However, this does not preclude a configuration in which both the oil pump 8 and the turbine 7 are disposed outside the case 1 as long as the turbine 7 is rotated by the cooling water and the pump rotor 88 is driven by the turbine 7.

(4) The above description exemplifies the form in which the oil supply port 62a is located to face the stator coil 24 and is made of the non-conductive member Z. However, the oil supply port 62a may be structured integrally with the case 1. For example, the oil supply port 62a may be made of a conductive member. In this case, it is preferable that the oil supply port 62a be located away from the stator coil 24 in order to ensure an insulation distance.

(5) The above description exemplifies the form in which the channel 4 includes the first heat exchange portion 41 and the second heat exchange portion 42. However, the channel 4 may include the first heat exchange portion 41 and the turbine disposition portion 43 without the second heat exchange portion 42. In this case, it is preferable that the first heat exchange portion 41 and the turbine disposition portion 43 be disposed in this order from the upstream side to the downstream side along the channel 4. However, this does not preclude disposition in reverse order.

(6) The above description exemplifies the form in which, when the channel 4 includes the first heat exchange portion 41, the second heat exchange portion 42, and the turbine disposition portion 43, the first heat exchange portion 41, the second heat exchange portion 42, and the turbine disposition portion 43 are disposed in this order from the upstream side to the downstream side along the channel 4. When the turbine disposition portion 43 is disposed on the upstream side in the channel 4, the flow rate of the coolant decreases and the cooling efficiency on the downstream side may decrease. When the cooling performance sufficiently satisfies the required specifications even if the flow rate decreases, however, the turbine disposition portion 43 may be disposed upstream of either or both of the first heat exchange portion 41 and the second heat exchange portion 42. Similarly, the order of the first heat exchange portion 41 and the second heat exchange portion 42 may be reversed.

Figure 4:
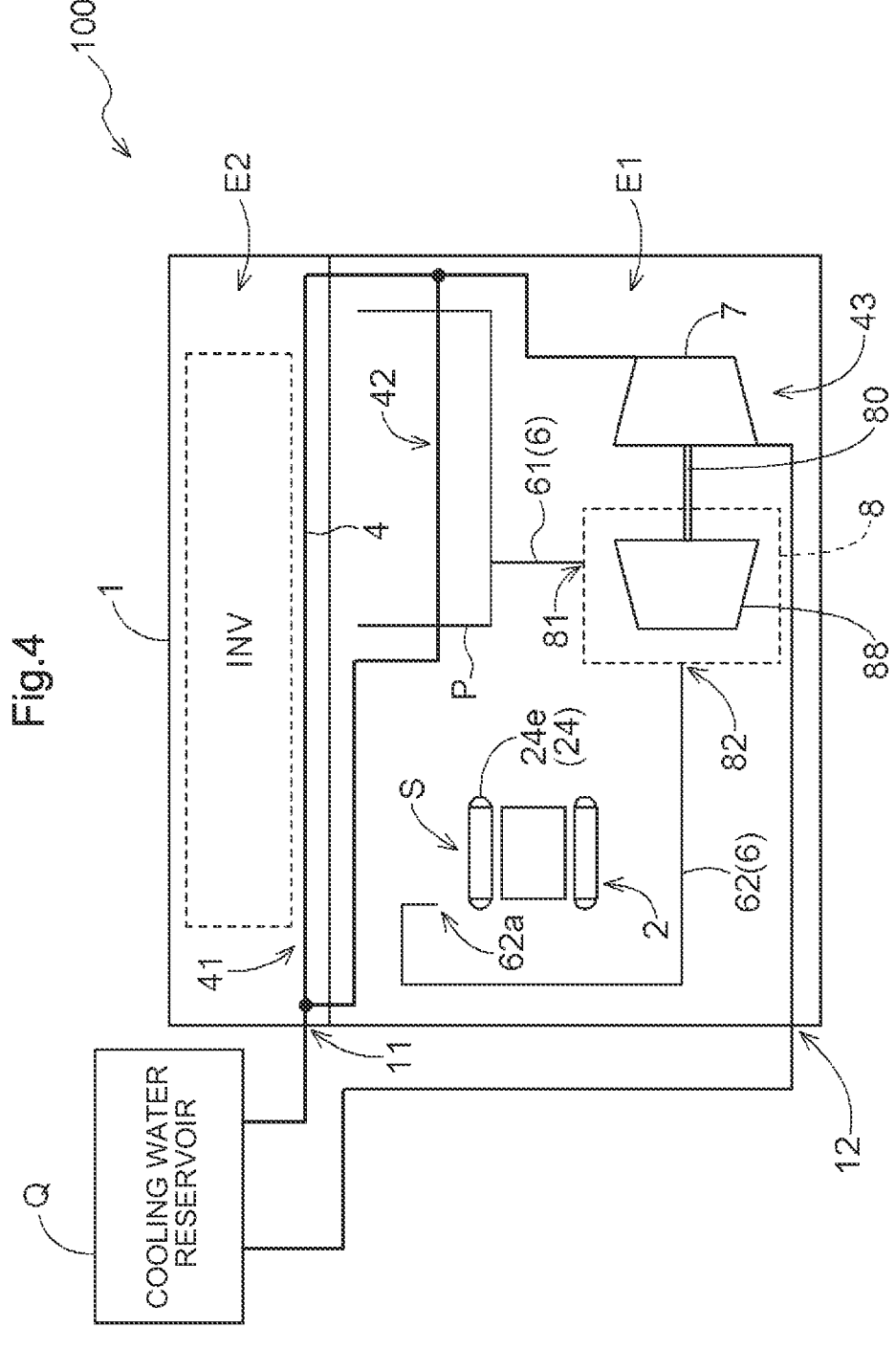
FIG. 4 is a diagram showing an example of the configuration of the oil pump and another example of the distribution paths of the oil and the coolant.

(7) Referring to FIG. 3, the above description exemplifies the form in which, when the channel 4 includes the first heat exchange portion 41, the second heat exchange portion 42, and the turbine disposition portion 43, the first heat exchange portion 41, the second heat exchange portion 42, and the turbine disposition portion 43 are disposed in series in this order from the upstream side to the downstream side along the channel 4. In the channel 4, however, the path through the first heat exchange portion 41 and the path through the second heat exchange portion 42 may be parallel to each other as exemplified in FIG. 4. In the form exemplified in FIG. 4, the channels 4 branched into the path through the first heat exchange portion 41 and the path through the second heat exchange portion 42 on the upstream side merge again and the turbine disposition portion 43 is disposed downstream of the merging point. Although illustration is omitted, the paths need not merge and the turbine disposition portion 43 may be disposed downstream of any one of the path through the first heat exchange portion 41 and the path through the second heat exchange portion 42. In this case, the branched paths may merge together downstream of the other one of the paths and downstream of the turbine disposition portion 43.

The description has been given of the exemplary form in which the channel 4 branches and merges inside the case 1. However, two inlets 11 and two outlets 12 may be provided and the path through the first heat exchange portion 41 and the path through the second heat exchange portion 42 may be disposed independently. Alternatively, one inlet 11 and two outlets 12 may be provided and the branched channels 4 may lead to the respective outlets 12 without merging. Alternatively, two inlets 11 and one outlet 12 may be provided and streams of the coolant flowing into independent paths may merge into one path and flow out from the one outlet 12.

[Summary of Embodiment]

Hereinafter, a brief summary of the drive device (100) described above will be provided.

In one aspect, a drive device (100) includes a rotary electric machine (2), an inverter (INV) configured to drive the rotary electric machine (2), a case (1) that houses the rotary electric machine (2) and the inverter (INV), and an oil pump (8) configured to discharge oil to be supplied to the rotary electric machine (2). The case (1) has a channel (4) along which coolant flows. The channel (4) includes a first heat exchange portion (41) where heat is exchanged between the inverter (INV) and the coolant, and a turbine disposition portion (43) where a turbine (7) is disposed. The turbine (7) is configured to rotate by a flow of the coolant passing through the turbine disposition portion (43), and a pump rotor (88) of the oil pump (8) is drivingly connected to the turbine (7).

According to this configuration, the turbine (7) can be rotated by the flow of the coolant, and the pump rotor (88) can be driven by the rotation of the turbine (7). Therefore, the configuration of the oil pump (8) can be simplified compared to a configuration in which a drive source for the oil pump is provided separately as in the case of, for example, an electric oil pump. Compared to a configuration in which the oil pump is driven by using the driving force of the rotary electric machine (2), a power transmission mechanism between the rotary electric machine (2) and the oil pump (8) is unnecessary, and the loss of the driving force of the rotary electric machine (2) due to the drive of the oil pump (8) can be avoided. The inverter (INV) is likely to generate heat in a situation where electric power is being supplied to the rotary electric machine (2). Therefore, it is often necessary to cool the rotary electric machine (2) as well in a situation where the inverter (INV) needs to be cooled. According to this configuration, in a situation where the inverter (INV) is being cooled by the coolant, the rotary electric machine (2) can also be cooled by supplying the oil to the rotary electric machine (2) through the drive of the oil pump (8) using the coolant. Thus, both the inverter (INV)

and the rotary electric machine (2) can appropriately be cooled at an appropriate timing. As described above, according to this configuration, the oil can be supplied to the rotary electric machine (2) at an appropriate timing while suppressing the increase in the cost and dimensions of the drive device (100).

In the drive device (100), it is preferable that at least one of the oil pump (8) and the turbine (7) be disposed inside the case (1).

For example, when the oil pump (8) is disposed inside the case (1), an oil passage (6) from the oil pump (8) to the rotary electric machine (2) can easily be shortened compared to a configuration in which the oil pump (8) is disposed outside the case (1). When the turbine (7) is disposed inside the case (1), the channel can easily be shortened compared to a configuration in which the turbine (7) is disposed outside the case (1).

In the drive device (100), it is preferable that the case (1) include a first housing portion (E1) that houses the rotary electric machine (2), and a second housing portion (E2) that houses the inverter (INV), and the first housing portion (E1) and the second housing portion (E2) be formed integrally.

According to this configuration, the channel (4) can easily be shortened compared to a configuration in which the first housing portion (E1) and the second housing portion (E2) are separated.

In the drive device (100), it is preferable that the first heat exchange portion (41) and the turbine disposition portion (43) be disposed in this order from an upstream side to a downstream side along the channel (4).

When the coolant rotates the turbine (7), the flow rate of the coolant decreases. Heat exchange is performed more effectively when the flow rate of the coolant is higher. According to this configuration, the first heat exchange portion (41) is disposed upstream of the turbine disposition portion (43) in the channel (4). Therefore, cooling can efficiently be performed in the first heat exchange portion (41) before the flow rate decreases due to the rotation of the turbine (7).

It is preferable that the drive device (100) further include a second heat exchange portion (42) where heat is exchanged between the oil stored in an oil reservoir (P) provided inside the case (1) and the coolant, and the first heat exchange portion, the second heat exchange portion, and the turbine disposition portion be disposed in this order from an upstream side to a downstream side along the channel (4).

By providing the second heat exchange portion (42) in addition to the first heat exchange portion (41) that cools the inverter device (INV) by exchanging heat with the inverter device (INV), the oil stored in the oil reservoir (P) can be cooled by exchanging heat with the oil. That is, both the oil and the inverter device (INV) inside the case (1) can be cooled by the coolant. For example, the oil stored in the oil reservoir (P) is supplied to a cooling target such as a coil end portion (24e) of the rotary electric machine (2) by the oil pump (8). Thus, the cooling target can be cooled.

By supplying the oil cooled by the coolant to the cooling target, not only the inverter device (INV) but also the cooling target can be cooled effectively. The first heat exchange portion (41) and the second heat exchange portion (42) are disposed upstream of the turbine disposition portion (43) in the channel (4). When the coolant rotates the turbine (7), the flow rate of the coolant decreases. Heat exchange is performed more effectively when the flow rate of the coolant is higher. According to this configuration, cooling can efficiently be performed in the first heat exchange portion (41) and the second heat exchange portion (42) before the flow rate decreases due to the rotation of the turbine (7). Since the coolant passes through the first heat exchange portion (41) before passing through the second heat exchange portion (42), the inverter device (INV) can appropriately be cooled by the coolant before the temperature rises by absorbing heat from the hot oil. That is, the inverter device (INV) can be cooled by the coolant having a higher cooling capacity.

DESCRIPTION OF THE REFERENCE NUMERALS

1: case, 2: rotary electric machine, 4: channel, 6: oil passage, 7: turbine, 8: oil pump, 11: inlet, 12: outlet, 21: rotor, 23: stator, 41: first heat exchange portion, 42: second heat exchange portion, 43: turbine disposition portion, 62a: oil supply port, 82: discharge port, 88: pump rotor, 100: drive device, E1: first housing portion, E2: second housing portion, INV: inverter, P: oil reservoir, Z: non-conductive member

The invention claimed is:
1. A drive device comprising:
a rotary electric machine;
a transmission mechanism that transmits power between the rotary electric machine and wheels;
an inverter configured to drive the rotary electric machine;
a case that houses the rotary electric machine, and the inverter and the transmission mechanism;
an oil pump configured to discharge oil to be supplied to the rotary electric machine;
an oils sump formed at a bottom of the case; and
a catch tank disposed on the upper side of the oils sump in the case,
wherein the oil accumulated in the oils sump is stirred by the transmission mechanism,
the catch tank catches the stirred oil and temporarily stores the oil before it falls into the oil sump,
wherein
the case has a channel along which coolant flows,
the channel includes a first heat exchange portion where heat is exchanged between the inverter and the coolant, a second heat exchange portion where heat is exchanged between the oil stored in the catch tank provided in the case and the coolant, and a turbine disposition portion where a turbine is disposed, and
the first heat exchange portion, the second heat exchange portion and the turbine disposition portion are disposed in this order from an upstream side to a downstream side along the channel, and
the turbine is configured to rotate by a flow of the coolant passing through the turbine disposition portion, and a pump rotor of the oil pump is drivingly connected to the turbine.
2. The drive device according to claim 1, wherein at least one of the oil pump and the turbine is disposed inside the case.
3. The drive device according to claim 1, wherein:
the case includes a first housing portion that houses the rotary electric machine, and a second housing portion that houses the inverter; and
the first housing portion and the second housing portion are formed integrally.
4. The drive device according to claim 1, wherein the first heat exchange portion and the turbine disposition portion are disposed in this order from an upstream side to a downstream side along the channel.

* * * * *